March 25, 1958    H. A. STEVENSON ET AL    2,828,027
MEANS OF HANDLING ARTICLES
Filed March 3, 1954      4 Sheets-Sheet 1
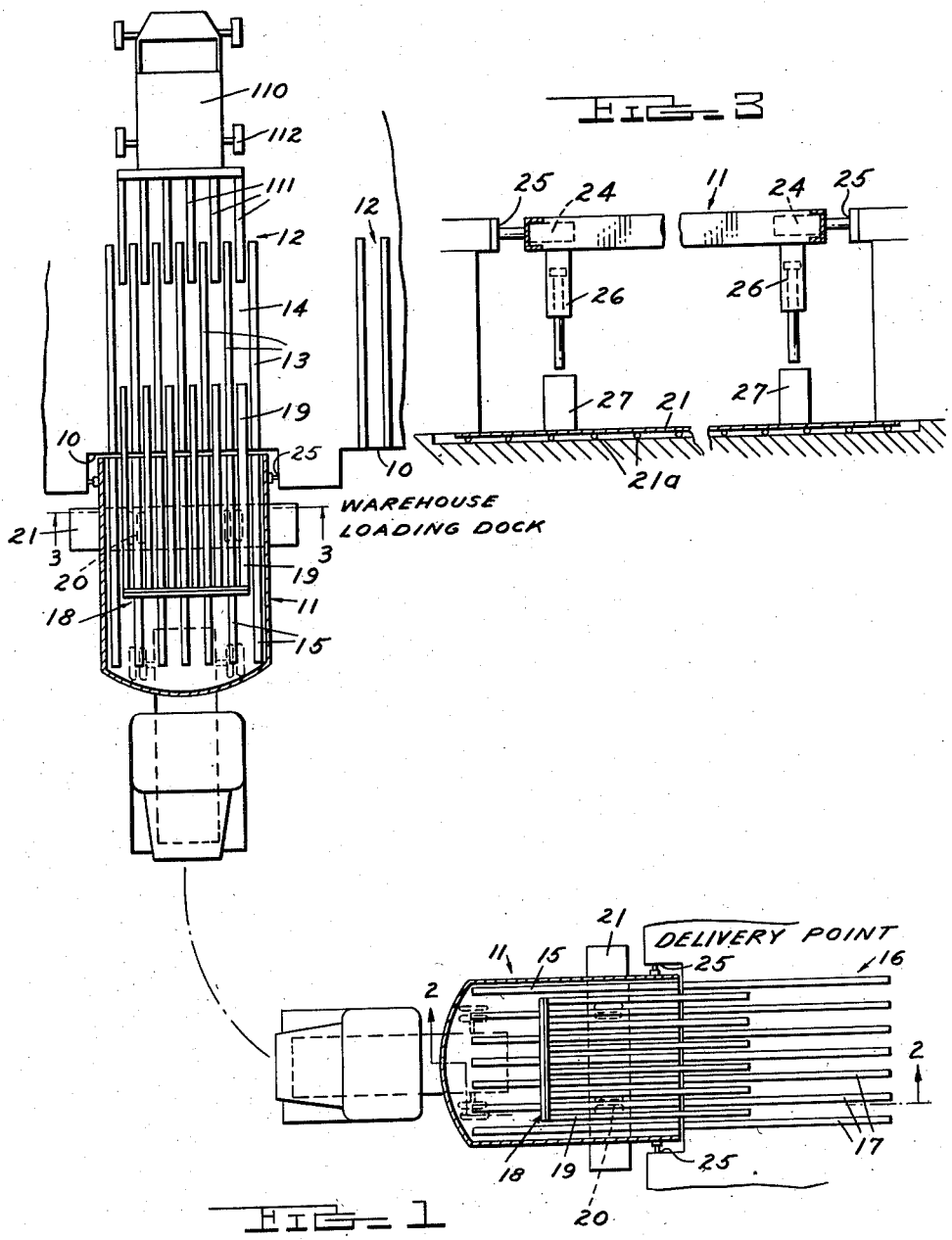
INVENTORS
HERBERT A. STEVENSON
GEORGE A. RAMLOSE
BY
Farley Forster & Farley
ATTORNEYS

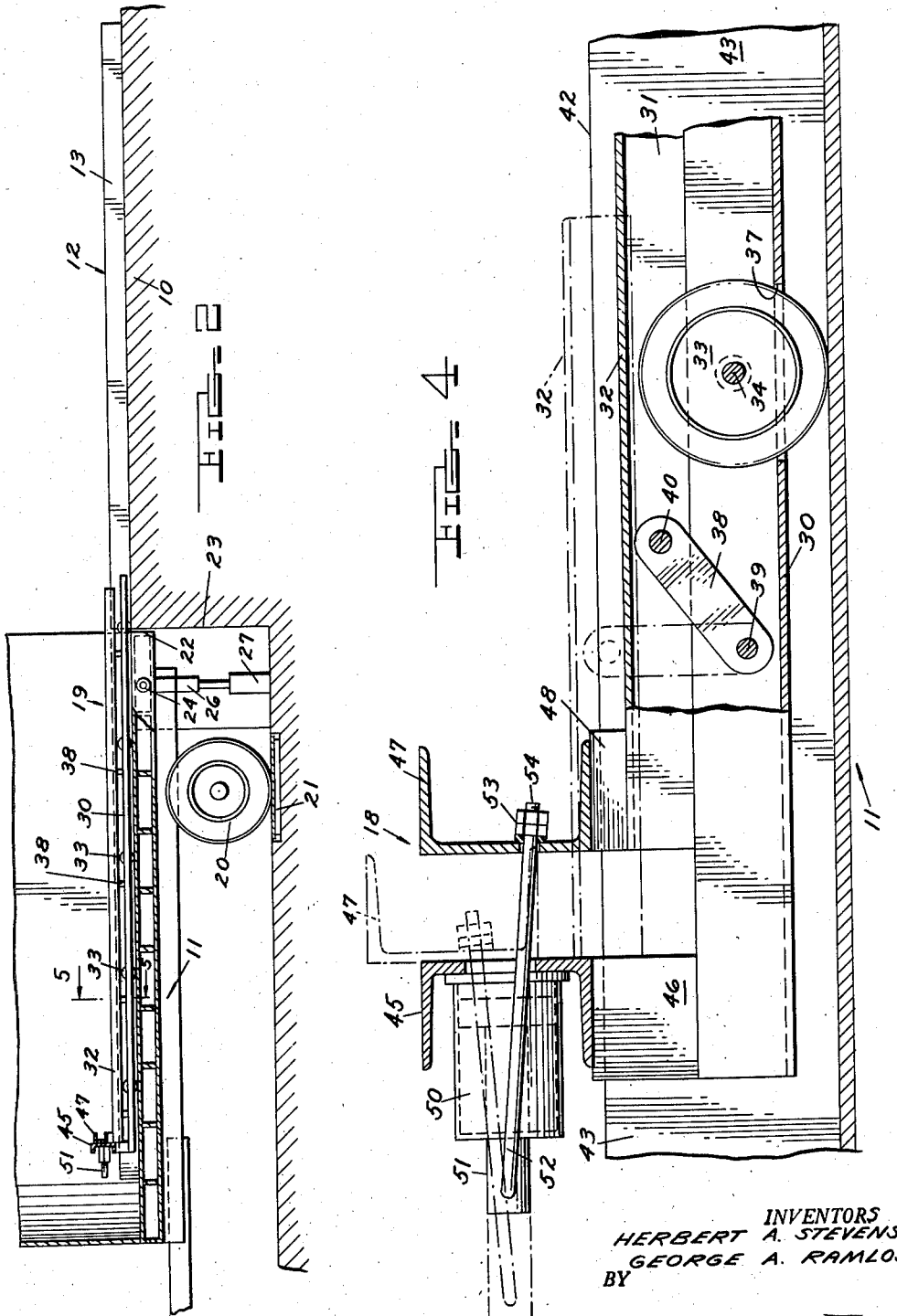

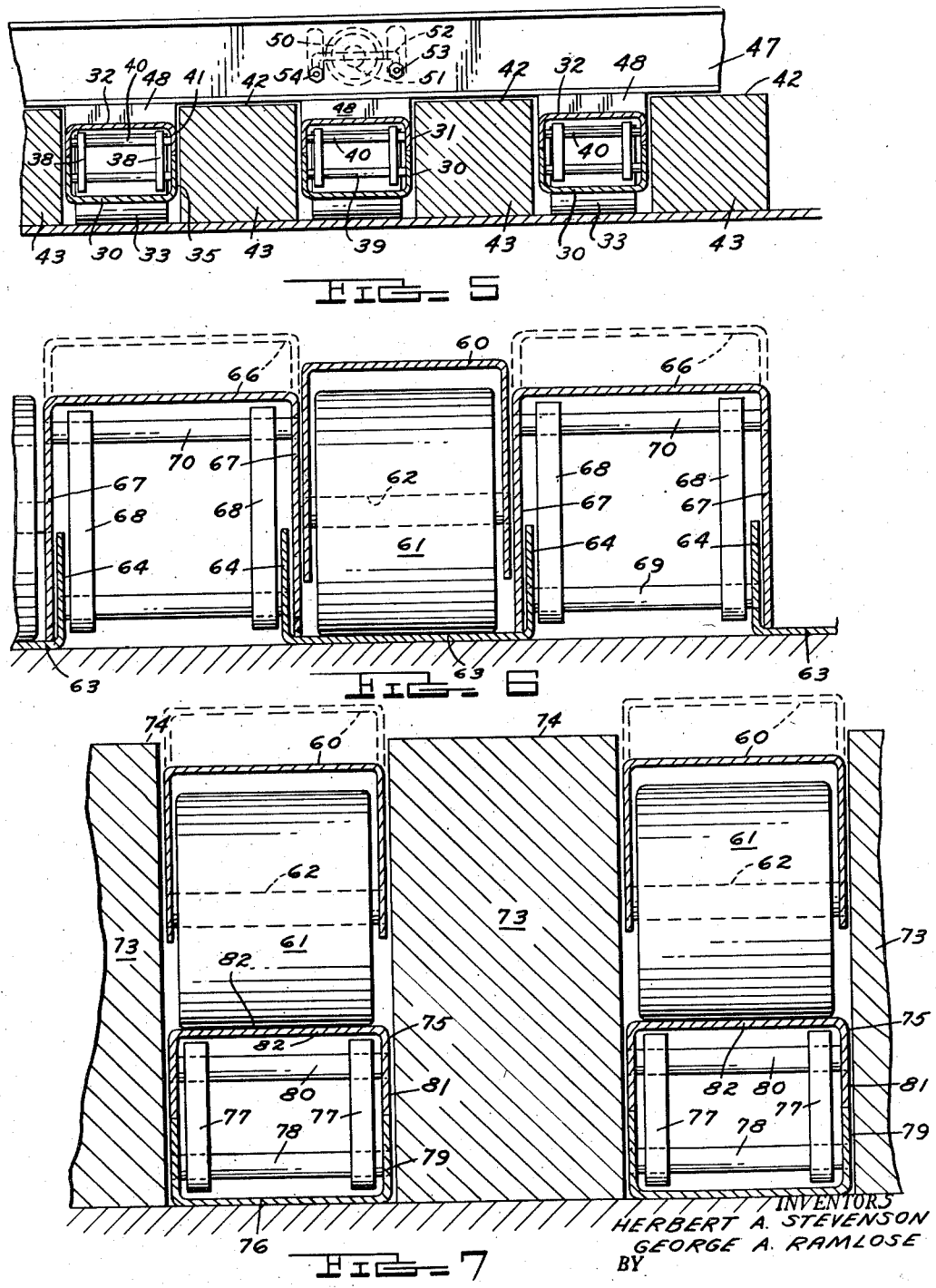

March 25, 1958 H. A. STEVENSON ET AL 2,828,027
MEANS OF HANDLING ARTICLES
Filed March 3, 1954 4 Sheets-Sheet 4
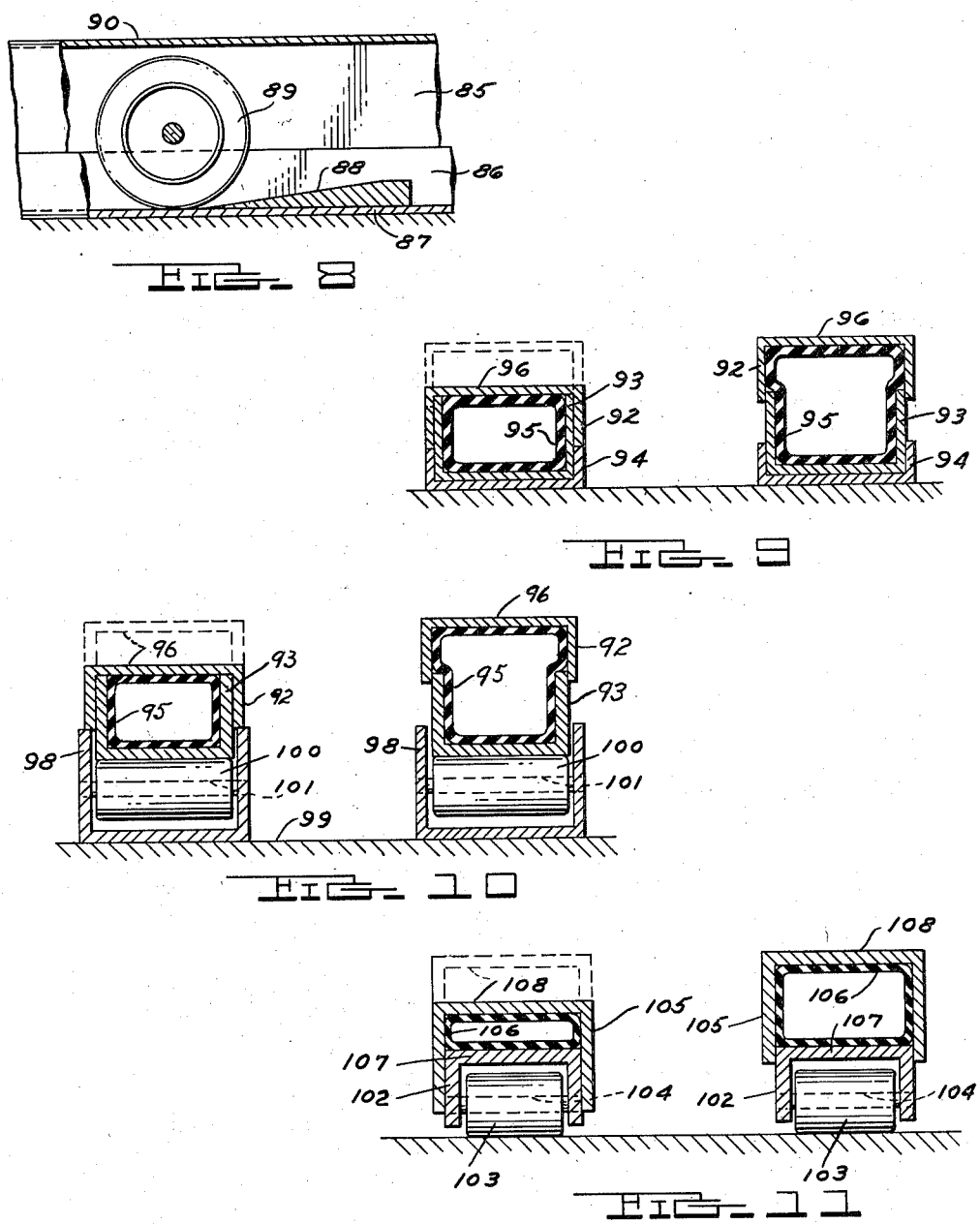
INVENTORS
HERBERT A. STEVENSON
GEORGE A. RAMLOSE
BY
Farley Forster + Farley
ATTORNEYS United States Patent Office 2,828,027
Patented Mar. 25, 1958

2,828,027

MEANS OF HANDLING ARTICLES

Herbert A. Stevenson, Grosse Pointe Farms, Mich., and George A. Ramlose, Hingham, Mass., assignors to George A. Ramlose Foundation, Inc., New York, N. Y., a corporation of New York Application March 3, 1954, Serial No. 413,839

12 Claims. (Cl. 214—38)

This invention relates to a system for handling packaged goods at loading and delivery points, and includes certain equipment for simplifying the task of transferring loads to a transporting vehicle at the loading point, and from the vehicle at the unloading point.

While the application of the invention is not limited to any particular field or any specific shipping problem, it does have particular utility in handling goods at a warehouse and between a loading dock and a delivery point in instances where the load is composed of a number of varied or similar articles. Where a warehouse is involved, the articles may be selected from stocks on hand at the warehouse. Accordingly, this type of handling situation has been selected to illustrate the invention because of the fact that more handling problems are involved than is the case in other applications, and therefore more of the features of the invention can be explained in connection with a single type of handling problem. One common example of the handling problem in question is that involved in the delivery of merchandise from a warehouse to supermarkets or chain stores. The warehouse is stocked with supplies of all the various articles kept on the shelves of the store, and periodically each store will submit orders to the warehouse for one or more cases of all the various items needed to replenish its stock. A process of selection is involved in making up a load according to the order received or, in other words, the correct number of cases of the particular articles ordered must be gathered together from various storage spaces in the warehouse. This affects the loading operation in one of two ways. If the articles are being loaded directly into the vehicle, the waiting time of the vehicle is increased. If the articles are gathered together, or the load marshaled in advance of the arrival of the vehicle, then a second handling operation is involved in transferring the load from the dock to the interior of the vehicle. In either case, there is a loss in efficiency and an increased cost in handling.

This same problem is present in almost all instances where articles are being transferred from one location, be it warehouse or vehicle, to a vehicle for a successive transporting operation. Many attempts have been made to solve it involving handling equipment, such as separate trailers which can be detached from a propelling tractor and left for loading; separate bodies or boxes for carrying the loads which can be rolled off or in and out of the vehicle; or pallets on which a load can be stored and/or assembled for transfer to the vehicle as a unit.

All such devices with which we are familiar are subject to certain objections to the way the load must be handled at the delivery point and offer no practical answer at points where deliveries are less frequent and the volume being handled does not justify the space or additional equipment required in the employment of presently known methods.

Again, this situation is aptly illustrated by the warehouse to retail store delivery operation. It is not practical to equip such a delivery point with the space required for the temporary storage of roll-off bodies, trailers, or separate containers, or the equipment required for handling pallets.

The present invention provides load handling means and a method which simplifies the handling operation at the loading point, and at the same time permits unloading at a delivery point without requiring extensive space or load-handling equipment. At the loading point, a load marshaling area is provided where articles can be assembled in a pile according to the size of the vehicle to be used in transporting them. This load-marshaling area is provided with a supporting surface consisting of a number of longitudinally parallel laterally spaced battens or strips, the lateral spacing being such that the normal size article can span and be supported upon two or more of the battens. Preferably, these load supporting strips are proportioned and spaced for cooperative relation with a device for handling the articles during their assembly at the loading point, such as a fork-lift truck.

At the unloading area or delivery point, a similar series of load supporting strips are provided, laterally spaced corresponding to the spacing of the strips at the loading point. The load carrying vehicle is equipped with a series of longitudinally extending roller slides laterally spaced so that they can be inserted between or interfingered with the strips at the loading and unloading points. This series of roller slides is movable relative to the vehicle. Means are also provided whereby a vertical relative movement can be obtained between the roller slides and the load supporting strips so that the load can be transferred from the strips to the slides and vice versa.

Provision is also made for aligning the load supporting surfaces of a vehicle and of the loading and unloading docks both laterally and vertically so that a smooth, even transfer of the load can be accomplished without undue maneuvering of the vehicle.

A number of specific constructions can be employed for accomplishing the results outlined above, and while a comparison of these constructions reveals certain advantages and relative disadvantages, a number of them will be illustrated in the more specific description of the invention to follow. It is felt that many opportunities will arise for the employment of the present invention and that certain constructions may be found preferable under some circumstances while not as preferable in others.

The accompanying drawings illustrate the system of the invention generally and disclose a few representative constructional examples available for putting the invention into practice. These drawings comprise the following views:

Fig. 1 is a schematic plan view illustrating the application of the general principles of the invention for handling a load between a warehouse, a vehicle and a delivery point;

Fig. 2 is a side elevation taken as indicated by the arrows 2—2 of Fig. 1, showing the relationship between a vehicle and a loading or unloading dock;

Fig. 3 is a sectional elevation taken on the line 3—3 of Fig. 1 and showing one construction for obtaining relative alignment between a vehicle and a loading or unloading dock;

Fig. 4 is a longitudinal sectional elevation of one type roller slide construction;

Fig. 5 is a sectional elevation on the line 5—5 of Fig. 2 showing the relationship between the roller slide construction of Fig. 4 and the fixed load supporting strips of a loading dock or vehicle body;

Fig. 6 is a view similar to Fig. 5 but showing an alternate construction available for obtaining the same general results of relative longitudinal and vertical movement between a roller slide and load supporting strips;

Fig. 7 is also a view similar to Fig. 5 showing a further type of construction available to accomplish this result;

Fig. 8 is a longitudinal sectional elevation of an alternate construction for providing vertical movement of the load supporting surface of a strip or slide;

Fig. 9 is a cross-sectional elevation of an alternate form of slide construction, and an alternate construction for obtaining vertical movement of a load supporting surface.

Fig. 10 is a cross-sectional elevation of another form of slide construction, employing stationary roller supports; and Fig. 11 is a view similar to Fig. 10 of a roller slide employing the same means for vertical movement.

The general aspects of the invention are illustrated in Figs. 1 and 2. Referring to Fig. 1, there is shown a warehouse loading dock equipped with a slip 10 into which a vehicle 11 may be backed for loading. A load marshaling area 12 is provided in the surface of the loading dock adjacent each slip. Each load marshaling area 12 has a width at least equal to the width of the load-carrying area of any vehicle that may be backed into the slip 10, and a length also at least equal to the length of the load-carrying area of any vehicle that may be loaded. If the length and width dimensions of the vehicle being employed are standardized, the dimensions of the load-marshaling area may also be correspondingly standardized.

At each load marshaling area 12 a grooved or corrugated load supporting surface is provided consisting of a number of parallel strips or battens 13 formed in the surface of the loading dock with the upper surface of the battens 13 preferably being flush with the surrounding floor. The battens are parallel in a longitudinal direction and are spaced laterally so that a groove 14 is formed between each adjacent pair of battens 13.

The vehicle 11 is constructed with a permanent floor formed of a corresponding series of longitudinally parallel laterally spaced battens 15, with spacing between battens corresponding to that employed at the load marshaling area.

The delivery point is also provided with a loading dock 16 large enough to accommodate at least one vehicle 11. The dock has an unloading area, also formed with a load supporting surface similar to that used at the load marshaling area and in the vehicle and comprising a series of longitudinally parallel laterally spaced battens 17 whose spacing laterally corresponds to the spacing of the battens 13 and 14.

In the preferred form of the invention, the vehicle 11 is equipped with a roller slide assembly 18 having a series of roller slides 19, each of which is positioned in the groove or track formed between an adjacent pair of the battens 15 and is movable longitudinally with respect thereto. Thus, when a vehicle 11 is properly positioned at the loading dock with its battens 15 longitudinally aligned with the battens 13 thereof, the roller slide assembly 18 can be moved out of the vehicle and the individual slides 19 projected or inserted between the battens 13 of the loading dock. A corresponding operation is possible at the unloading area when the vehicle battens 15 are longitudinally aligned with the battens 17 thereof.

Representative means for accomplishing proper alignment between the load supporting surfaces of a truck or vehicle and a dock are illustrated in Figs. 2 and 3. The dock is constructed so that the rear wheels 20 of the vehicle rest upon a steel plate 21 when the rear end 22 of the vehicle is adjacent the face 23 of the dock. Horizontally acting jacks 24 are provided to act between the vehicle body and the projecting sides 25 of the dock slip 10. These jacks may be attached to the truck body as shown, or be built into the side of the dock. Two such jacks are preferably employed so that the truck body can be positively moved in either transverse direction to accomplish a longitudinal alignment between the load supporting surfaces of the truck and the dock with a minimum amount of maneuvering of the truck. The vehicle tires will slide on the surface of the plate 21, or with heavier vehicles the plate 21 may be supported on rollers 21a for transverse movement.

Once this longitudinal alignment has been obtained by a manipulation of the jacks 24, the truck bed is then aligned vertically with the dock surface. Jacks 26 are shown for this purpose, these being carried by the truck body and mounted to engage blocks 27 which are employed to shorten the stroke required of the jacks 26. The jacks 26 may also be incorporated in the dock structure if desired, rather than mounted on the truck body itself. Proper manipulation of these vertical jacks 26 positions the truck body and dock at the same level, and likewise supports the truck body against spring and tire deflection while a load is being transferred.

The invention includes the provision of some means for accomplishing a relative vertical movement between the roller slides 19 and at least the battens 13 and 17 of the loading and unloading areas, respectively, in order that a load can be transferred from the supporting surfaces provided in the series of battens 13 at the loading area, to the roller slides 19 of the vehicle 11 for transfer thereto by longitudinal movement of the roller slides, and so that a reversal of this operation can be accomplished at the unloading area to transfer the load onto the load supporting surfaces of the series of battens 17. Preferably, the means employed for this purpose will also permit the transferral of the load from the surfaces of the roller slides to the battens 15 of the vehicle body so that the load is supported on a solid bed during its transport.

One such construction is shown in Figs. 4 and 5 which illustrate a roller slide having a vertically movable load supporting surface and the relationship between this surface and the supporting surfaces of any of the series of battens employed, either at the loading area, on the vehicle, or at the unloading area.

This roller slide is formed by a pair of channel members 30 and 31, the upper channel 31 being inverted to form a load supporting surface 32. A number of rollers 33 are each supported on an axle 34 carried between the vertical sides 35 of the lower channel 30, each roller projecting through a slot 37 formed in the horizontal surface of the channel.

The upper channel 31 is connected to the lower channel 30 by a series of links 38 which are arranged in pairs. Each pair of links is carried on a pin 39 extending between the vertical legs 35 of the lower channel 30 and on a second pin 40 extending between the vertical legs 41 of the upper channel 31.

In normal or lowered position, the vertical legs 41 of the upper channel 31 rest upon the edge of the vertical legs 35 of the lower channel 30 and the supporting surface 32 of the upper channel is positioned below the level of the supporting surface 42 of the battens 43. These battens 43 may be considered as either the battens of the loading area, of the vehicle bed, or of the unloading area, since in either case the relationship between the roller slide and the battens is the same.

An assembly of roller slides is made by interconnecting the ends of the lower channel members 30 which project into the vehicle by a cross-member 45, shown as comprising a channel connected to each lower member 30 by a spacer 46, so that the channel member 45 clears the supporting surfaces 42 of the battens 43. A similar connection is employed between the ends of the upper members 31 of the roller slides, this connection including a transverse channel member 47 secured to each upper slide member 31 by a spacer 48.

Some means are employed for moving the upper slide member 31 longitudinally relative to the lower slide member 30, such movement being accompanied by a rotary movement of the links 38 and a consequent raising of the supporting surface 32 of the upper member above the level of the supporting surface 42 of the battens 43. Such means may comprise a hydraulic jack 50 as illustrated, mounted on the transverse member 45, and having a U bolt 52 pivotally connected to the piston rod 51. Nuts 53 adjustably connect the free ends 54 of this U bolt to the transverse cross member 47. Actuation of the jack 50 will draw the member 47 toward the member 45, causing a movement of the upper portion of each roller slide of the assembly to the position indicated by the dotted lines where the supporting surface 32 of the upper slide member projects above the level of the supporting surface 42 of the battens 43.

It can thus be seen that the roller slide assembly can, when the vehicle is properly aligned with the dock as previously described, be withdrawn from the vehicle and projected beneath a load supported on the surfaces of the dock battens. When in proper position under the load, the jack 50 can be actuated to raise the supporting surfaces 32 of the roller slide assembly, transferring the load thereto from the battens 43.

The entire slide assembly and load supported thereby, which has been arranged on the loading dock in a pile corresponding to the interior dimensions of the vehicle, can be wheeled off the dock and into the vehicle. Suitable power means can be employed to assist in this operation if desired. The space between each pair of battens acts as a trackway to guide the movement of each roller slide during this operation.

Preferably, the parts of the roller slide assembly are arranged so that when the upper slide members have been moved to their raised position, the pin 40 of each pair of links 38 has passed beyond a position of vertical alignment with the pin 39 thereof and at the same time, the cross member 47 has been placed in a position of abutment with the cross member 45. This positively locks the slide in its upper position.

Once the load is properly positioned in the vehicle, the roller slide assembly is preferably lowered, transferring the load onto the battens 15 thereof and from the pins 39 and 40 of the roller slide assembly. The vehicle is then taken to the delivery point, positioned to bring the respective battens 15 and 17 into alignment, and the upper members 31 of the roller slide assembly are again raised. With the load now supported by the roller slide assembly, the assembly can be wheeled out of the vehicle onto the unloading dock, the upper slide members lowered to transfer the load to the dock battens 17, and the slide drawn back into the vehicle. If desired, the rear or outer end portion of the load alone may be unloaded by lowering the roller slide assembly, drawing it back under the load to be retained, raising it and moving it back into the vehicle.

It will thus be seen that the transfer of a load from loading dock to vehicle and vice versa is accomplished by the provision of alternate laterally spaced load supporting surfaces which are relatively movable longitudinally and vertically. Many constructions are available for meeting this requirement, and by way of example only, a few possible alternate constructions are illustrated in Figs. 6 to 11. Where battens are shown or indicated in these figures, they may be considered as forming part of either the loading area, the vehicle bed, or the unloading area.

Referring to Fig. 6, relative vertical movement is provided in the batten construction rather than in the roller slide. The roller slide simply consists of a U-shaped channel member 60 carrying a suitable number of rollers 61, each being mounted on an axle 62 extending between the vertical legs of the member 60. The rollers 61 are supported on a fixed U-shaped channel member 63, whose upper horizontal surface forms a trackway, and whose vertically extending legs 64 form a portion of the structure of an adjacent batten. Such batten is composed of a channel member whose upper horizontal surface 66 forms a load supporting surface and whose vertically extending legs 67 act as guides for the roller slide. This channel is connected by pairs of links 68 to the vertical flanges 64 of adjacent channel members 63, the links 68 being supported upon a pin 69 extending between the flange 64 and upon a second pin 70 extending between the vertical legs 67 of the batten channel member. Relative longitudinal movement of the batten channel member to the fixed channel member 63 will be accompanied by rotary movement of the links 68 and a raising of the level of the load supporting surface 66 of the batten in a manner similar to that operation described for the prior construction of roller slide. Similar means can be employed for producing this movement and for locking the batten surfaces in raised position.

In loading operations with this construction, the load is arranged on the battens when in their raised position. The roller slides can then be moved under the load and, as a result, the load can be transferred from the battens to the roller slides mainly by gravity action, it being only necessary to apply enough force to move the links 68 past a dead-center position. If this construction is installed at a loading dock, the battens can generally be raised to their upper position in an unloaded state, and therefore if this construction is employed for loading operations alone, power means for accomplishing relative vertical movements would not be essential.

Fig. 7 illustrates a construction where the relative vertical movement is provided by changing the elevation of the roller trackways. Here, the battens 73 are of solid construction and the elevation of their load supporting surfaces 74 is fixed. The roller slide construction is similar to that shown in Fig. 6, and corresponding reference numerals have been applied. Each roller trackway comprises a pair of upper and lower opposed channel members 75 and 76, respectively. The lower member 76 is fixed, and the upper member 75 is attached thereto by pairs of links 77 carried by pins 78 extending between the vertical walls 79 of the lower member and pins 80 extending between the vertical walls 81 of the upper member 75.

Again, relative longitudinal movement between the members 75 and 76 results in raising the elevation of the upper member 75 and, hence, its roller supporting surface 82, and moving the supporting surface 60 of the roller slide to the dotted position shown.

If this construction is installed in the dock at an unloading point, the desired method of operation is to pre-set the roller slide supporting surfaces 82 of the dock area in their raised position. The truck or vehicle is leveled to this position and the roller slide assembly rolled out onto the unloading dock. Then the surfaces 82 can be lowered, depositing the load from the roller slides onto the supporting surfaces 74 of the battens 73. The truck is then re-aligned to the lower level of the roller slide supporting surfaces 82 so that the roller slide assembly can be wheeled back into the truck. The advantage gained is that the transfer operation is performed largely by gravity, eliminating the necessity for power equipment.

With the constructions of Figs. 6 and 7, no provision for vertical movement is made in the construction of the roller slide assembly itself. This structure is relatively simple and carries the weight of the load directly on the rollers. It is thus possible to design this construction to carry the weight of the load at all times, employing no means for transferring the load to a stationary supporting surface while in the vehicle. In this case, the roller slide, after being wheeled into the vehicle is simply locked against movement by suitable hold-down means, and the vehicle structure thus made much simpler.

An inclined plane construction is illustrated in Fig. 8 for obtaining relative vertical movement between the load supporting surfaces of the strips and slides. This view is a side elevation of a portion of a strip, partly broken away in section. Upper and lower channel members 85 and 86 are employed, the horizontal surface 87 of the lower channel member being supported by the loading dock structure and fixed thereto. A series of inclined planes 88 are secured to the lower channel member 86, and a series of rollers 89 are journaled on axles supported between the side walls of the upper channel member 85. Longitudinal movement of the upper channel member 85 relative to the lower channel member 86 will be accompanied by movement of each roller 89 up an inclined plane 88, and raising the load supporting surface 90 of the upper member 85.

This same constructional principle can be employed for a roller slide, in which case, an additional series of rollers will be supported between the side walls of the lower channel member 86 and project through slots formed in the bottom wall thereof in the manner shown in the construction of Fig. 4.

Fig. 9 illustrates another possible type of slide construction—one where no rollers are used to reduce the friction between the slide and its trackways, and where different means are employed for accomplishing vertical movement of the load supporting surface. Again, the slide is composed of upper and lower channel members 92 and 93. The lower channel member 93 is shown supported by and in a channel trackway 94. A suitable lubricant would ordinarily be employed between the adjacent surfaces of the lower member 93 and the trackway 94 to reduce friction and make longitudinal movement of the slide easier.

A resilient expandable diaphragm or tube 95 is inserted within the opposed upper and lower channels 92 and 93 and is adapted to be expanded from a source of fluid pressure to produce vertical movement of the load supporting surface 96 of the upper member.

Obviously, the same construction can be employed for a load supporting strip, in which case, the trackway member 94 would not be needed. Relatively large areas of contact are involved between the diaphragm 95 and the upper and lower members so that the amount of pressure required to vertically move a load by this construction would not be unduly great. It would be practical, for example, to equip the vehicle with an air pressure tank for actuating the tubes 95. This tank could be replenished by servicing equipment provided at the loading point. Normally only one operation of inflating the tubes 95 would be involved in the delivery of each load.

Fig. 10 illustrates a construction where the same fluid pressure principle is employed for the construction of a slide which rolls in a trackway equipped with rollers mounted on fixed axles. The slide construction is the same as that shown in Fig. 9 and similar reference characters have been applied to its parts. This slide construction moves in a trackway composed of a channel member 98 fixed to a supporting surface 99, which may be either the bed of a vehicle or the structure of a loading dock. A series of rollers 100 are carried between the vertical walls of the channel member 98, each on a fixed axle 101. This type of roller trackway construction can of course be employed with any of the types of slide construction previously discussed.

Likewise, a mounting of the rollers on the slides instead of on the trackway can be employed with the fluid pressure diaphragm principle as shown in Fig. 11. Here, the lower slide member 102 is a channel equipped with a series of rollers 103 mounted on axles 104 extending between its vertical side walls. The upper slide member is a channel member 105 whose side walls straddle the side walls of the lower member 102 for free sliding relative movement therebetween. A tube 106 is inserted between the inner surface of the upper channel member and the upper surface 107 of the lower channel member 102 so that expansion of the tube 106 under fluid pressure will cause vertical movement of the upper member 105 relative to the lower member 102 and a raising or lowering of the load supporting surface 108.

We recognize that many other constructions can be employed to change the relative level of the load supporting surfaces of the strips and roller slides. It is felt that the adaptation of known mechanical devices, such as inclined planes, wedges, cams, or eccentrics for this purpose is so obviously within the capability of a skilled man in the art, and the possible number of physical constructions are so numerous that it would be futile to try to disclose them all in the present specification. Accordingly, the constructions illustrated and discussed were selected for the purpose of showing a few examples, and are to be regarded as representative only.

Returning now to the specific case for application of the invention mentioned earlier in the specification—that of handling articles between a warehouse and a chain-grocery store—a brief discussion of the manner in which this particular load handling operation can be carried out with the aid of the invention will now be given, with the thought that this discussion will serve to well illustrate the features and advantages of the invention in the material handling field generally, as well as in this specific problem.

The volume of merchandise delivered to any particular store is not great enough to justify the cost of any of the types of material handling equipment conventionally employed, so that at the present time the usual unloading practice is to manually handle each article of merchandise being delivered. Many of these stores, however, already have, or are large enough to justify the cost of a loading dock, which can be equipped with a series of load supporting strips or battens at relatively little extra cost. Once this has been done, and this cost has shown to be justified, the invention can be placed in operation, for the cost of the load supporting strips and roller slides at the loading area and in the vehicle will compare favorably with other types of handling equipment, particularly, in view of the additional advantages obtainable.

The load for any particular store will be made up from an order specifying certain numbers of many different articles. A process of selection is therefore required at the warehouse to assemble this order at the load marshaling area. One very important feature of the invention is the interrelationship afforded between the load supporting strips at the load marshaling area and other load handling equipment employed for depositing the load at the marshaling area. For example, wheeled trucks may be used in the warehouse, propelled either by hand or by drive-lines, for gathering the components which will make up any load. A manual handling is usually required for transferring an article from its storage space in the warehouse to such a truck. With proper relationship between the load handling components, this manual handling can be made the only one involved in the entire delivery operation. The floor truck beds can be equipped with load supporting strips corresponding in lateral spacing to those of the load marshaling area. A conventional fork truck 110 (Fig. 1) can be employed having tines 111 laterally spaced to correspond to the spacing of the load supporting strips of the marshaling area. Then, after a load unit has been assembled on a warehouse truck by the process of selection, it can be transferred bodily to the load supporting surfaces of the marshaling area by the fork truck, whose tires 112 can be arranged so that the truck may readily be driven either between or over the surfaces of the supporting strips to deposit successive load units until the complete order has been assembled and arranged at the marshaling area in a pile dimensioned to fit inside the vehicle which is to transport it.

The transfer of this load to a vehicle and from the vehicle to the unloading area at the delivery point proceeds as previously discussed, with no manual handling until after the entire load has been removed as a unit from the vehicle and deposited on the loading dock of the store to await the convenience of the store personnel for properly storing the components.

Obviously, the same elimination of manual handling operations can be obtained in other situations. Loads can be marshaled by fork trucks from take-it-or-leave-it pallets, or conventional pallets, or any other means most adaptable for handling a particular type of article. The load may be arranged at the marshaling area as a single unit, or in plurality segments for successive unloading from the vehicle at a plurality of delivery points. It can thus be seen that the system of the present invention and equipment involved therewith has sufficient flexibility and adaptability to meet the problems encountered in practically all warehouse operations and in many other operations involving the transfer of a load of articles from one location to another. At the same time, the cost of the equipment required to put the invention into practice is well within limits justifiable by the practical advantages obtainable and by comparison with the cost of equipment in current use which does not so completely eliminate manual handling, reduce waiting time, and provide for the servicing of low-volume delivery points.

Such modifications and adaptations of the invention recognized herein and available to those skilled in the art as are included within the scope of the following claims are to be considered as part of the invention.

We claim:

1. Means for assembling, loading and unloading a plurality of articles in load units between a shipping point, a vehicle and a delivery point comprising a load marshaling area provided at said shipping point, said marshaling area being formed by a series of longitudinally parallel laterally spaced strips forming load supporting surfaces separated by intermediate grooves having surfaces forming trackways below the level of the load supporting surfaces of said strips, said grooves having a width and spacing to receive a fork-type load handling device for depositing articles on the load supporting surfaces of said marshaling area; load receiving areas provided on said vehicle and at said delivery point, said load receiving areas each including a series of longitudinally parallel strips and intermediate grooves corresponding in spacing and formation to the said strips and grooves of said marshaling area; a series of load supporting slides having length and width dimensions approximately equal to those of the load receiving area of said vehicle, means transversely interconnecting all slides adjacent one end thereof, means supporting each of said slides for longitudinal movement on the said surfaces of said grooves whereby said slides may be completely withdrawn from said vehicle onto said marshaling area and said receiving area and moved within said vehicle; and means for changing the relative vertical level between the load supporting surfaces of said slides and any of said series of strips whereby a load unit may be transferred from the supporting surfaces of said marshaling area to said slides and from said slides to said vehicle and to said receiving area, said level changing means including upper members forming one of said load supporting surfaces, lower members associated with each of said upper members, and means for moving said upper members vertically relative to said lower members.

2. Article handling means for the transfer and transport of articles in load units between a loading point, a vehicle bed and an unloading point, comprising a load handling area provided at said loading and unloading points, said load handling areas each having a series of longitudinally parallel laterally spaced strips forming laterally spaced load supporting surfaces and intermediate grooves, a series of slides having load supporting surfaces proportioned and laterally spaced for interfingered insertion in said grooves, said series of slides having length and width dimensions approximately equal to those of said vehicle bed, said vehicle bed being provided with a series of longitudinally parallel laterally spaced strips forming laterally spaced load supporting surfaces and intermediate grooves, said vehicle bed strips and grooves being laterally spaced for alignment with the said strips and grooves of the load handling areas, each of the said grooves of said load handling areas and vehicle bed having a supporting surface adapted to be engaged by one of said slides and forming trackways therefor, means interconnecting all slides of said series adjacent one end thereof, means supporting the slides of said series for horizontal movement in said grooves as trackways between said loading point, said vehicle bed and said unloading point, and means for changing the relative vertical level between the load supporting surfaces of said series of strips and said movable series of slides whereby a load unit may be transferred from the loading point to said vehicle bed and from said vehicle bed to said unloading point.

3. Article handling means according to claim 2 further characterized by said load supporting slides each comprising a lower member, and an upper member, means supporting said upper member on said lower member for vertical movement of said upper member between a position where said upper member is below the level of the load supporting surface of said strip to a position where said upper member is above said level, and transverse members interconnecting each of said lower slide members at one end thereof and interconnecting the adjacent end of each of said upper slide members.

4. Article-transferring means according to claim 3 further characterized by said means for supporting said upper slide members upon said lower slide members for vertical movement providing such movement in response to relative longitudinal movement between said upper and lower slide members, and means for moving the transverse connecting member of said upper slide members relative to the transverse connecting member of said lower slide members to produce such relative longitudinal movement.

5. Article-transferring means according to claim 3 further characterized by said means for supporting said upper slide members comprising links connected between said upper slide members and said lower slide members and actuating means secured to one set of members of said series of slides and connected to the other set of members thereof for producing relative longitudinal movement therebetween and resulting vertical movement of said upper members as defined by said links.

6. Article-transferring means according to claim 3 further characterized by said means for supporting said upper slide members comprising a series of rollers carried by said upper slide members, said lower slide members each having a supporting surface for said rollers, said supporting surface including a series of inclined planes, and actuating means secured to one set of members of said series of slides and connected to the other set of members thereof for producing relative longitudinal movement therebetween and resulting vertical movement of said upper members as defined by said inclined planes.

7. Article handling means according to claim 2 wherein the load supporting surfaces of said series of strips each being formed by the upper surface of a separate member, and means mounting said member for vertical movement between a position where the said load supporting surface thereof is below the surface of an adjacent slide to a position where said load supporting surface is above the surface of an adjacent slide.

8. Article handling means according to claim 2 wherein said means for changing the relative vertical level between the load supporting surfaces of said series of strips and said longitudinally movable series of slides comprises means for supporting and vertically moving said trackways relative to the load supporting surfaces of the strips adjacent thereto.

9. Article handling means according to claim 2 wherein said means for changing the relative vertical level between the load supporting surfaces of said series of strips and said longitudinally movable series of slides includes a pair of superimposed members interengaged for vertical telescoping movement, and a fluid pressure expandible tube positioned between said members to produce vertical movement of the upper member of said pair in response to fluid pressure supplied to said tube.

10. Article handling means according to claim 9 wherein one of the series of load supporting surfaces defined by said series of strips and said series of slides are each formed by the upper of a pair of channel members, the parallel flanges of one of said channel members overlapping the parallel flanges of the other thereof for relative vertical telescoping movement, and a fluid pressure expandible tube positioned between said pair of channel members to produce such vertical movement of the upper member in response to the fluid pressure supplied to said tube.

11. Article handling means according to claim 2 wherein the said means for changing the relative vertical level between the load supporting surfaces of said series of strips and slides includes horizontally extending, vertically expandible fluid pressure tubes forming part of the structure of at least one set of said load supporting surfaces.

12. Article handling means according to claim 2 further characterized by means carried by said vehicle for laterally and vertically aligning said series of vehicle bed strips with the series of strips at said load handling areas.

References Cited in the file of this patent

UNITED STATES PATENTS

| | | |
|---|---|---|
| 493,542 | Bessing et al. | Mar. 14, 1893 |
| 1,132,960 | Moreland | Mar. 23, 1915 |
| 1,306,158 | Walker | June 10, 1919 |
| 2,001,253 | Kittleson | May 14, 1935 |
| 2,061,495 | Woodruff | Nov. 17, 1936 |
| 2,117,067 | Ludington | May 10, 1938 |
| 2,437,806 | Dempster | Mar. 16, 1948 |
| 2,451,226 | Kemp | Oct. 12, 1948 |
| 2,647,647 | Alimanestiano | Aug. 4, 1953 |

FOREIGN PATENTS

| | | |
|---|---|---|
| 142,974 | Australia | Feb. 23, 1950 |